Figure 1:
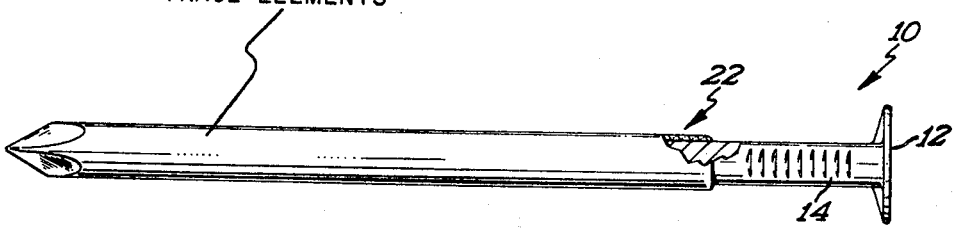

Oct. 25, 1966   R. L. LAING   3,280,504

TREE INJECTION DEVICE

Filed May 25, 1962

INVENTOR.
ROBERT L. LAING
BY Frederick E. Lange
ATTORNEY

United States Patent Office 3,280,504
Patented Oct. 25, 1966

3,280,504
TREE INJECTION DEVICE
Robert Louis Laing, Fort Worth, Tex.
(3527 Aquila Ave. S., Minneapolis, Minn. 55426)
Filed May 25, 1962, Ser. No. 197,610
The portion of the term of the patent subsequent to
January 22, 1980, has been disclaimed
11 Claims. (Cl. 47—57.5)

This application is a continuation-in-part of my application Serial No. 672,488, filed July 17, 1957, now abandoned, my application Serial No. 807,275, filed April 20, 1959, now Patent 3,074,207, granted January 22, 1963, and my application Serial No. 51,506, filed August 24, 1960, now Patent 3,137,968, granted June 23, 1964.

This invention relates to a composition and method for treating trees. More particularly this invention relates to a chemical mixture of trace element salts and plant treating compounds which are combined in a solid implanting device for injection directly into the living plant tissue.

At the time of filing the application 807,275 little was known about the response of trees in various localities to salts of trace elements other than sulfates. Sulfates of the trace minerals were used at that time out of several considerations. Some of the reasons include the favorable water solubility of sulfates, the therapeutic value, and the low cost.

Since that time several other salts have been tested in various localities and it has been found that trees in nitrogen deficient soils in general respond better to nitrate salts of the trace elements; trees in phosphorous deficient soils respond better to phosphates of trace elements; and trees in nitrogen and phosphorous deficient soils respond better to metallic salts of ammoniated phosphates. Trees in alkaline soils in general respond better to acetates, propionates and butyrates of the metals and trees in acid soils respond better generally to hydroxides of the metals. In humid areas and other localities tartaric acid or metallic tartrates seem, in addition to the benefit of trace elements, to have a therapeutic effect against potential growths such as fungi. Thus, in some experiments, mistletoe dried up and fell off trees three weeks after application.

Since some of the above named chemicals are relatively insoluble in water (or sap), it is desirable to add a chelating agent such as ethylenediaminetetraacetic acid to keep the trace elements nonionized and water soluble for quick absorption into the plant serum.

Also at the time of filing the application 807,275 it was felt that too much of certain of the trace elements might overstimulate and kill the trees, especially if administered unjudiciously by the buying public. Therefore only small amounts were placed on each nail. Since that time, the assumption was proven untrue. Experiments were made driving as many as twenty coated nails into one tree, coated heavily with only one trace element, and no trees died as a result. The quantity of trace elements were then increased on each nail and the results were more favorable and distinct.

Objects of the present invention are to provide chemical compositions to be sold at various locations in the United States that would produce optimum characteristics at each locality; to increase the amount of trace elements applied for more noticeable results; to provide chelates for more rapid absorption; and to add tartaric acid for a general therapeutic effect.

Figure 2:
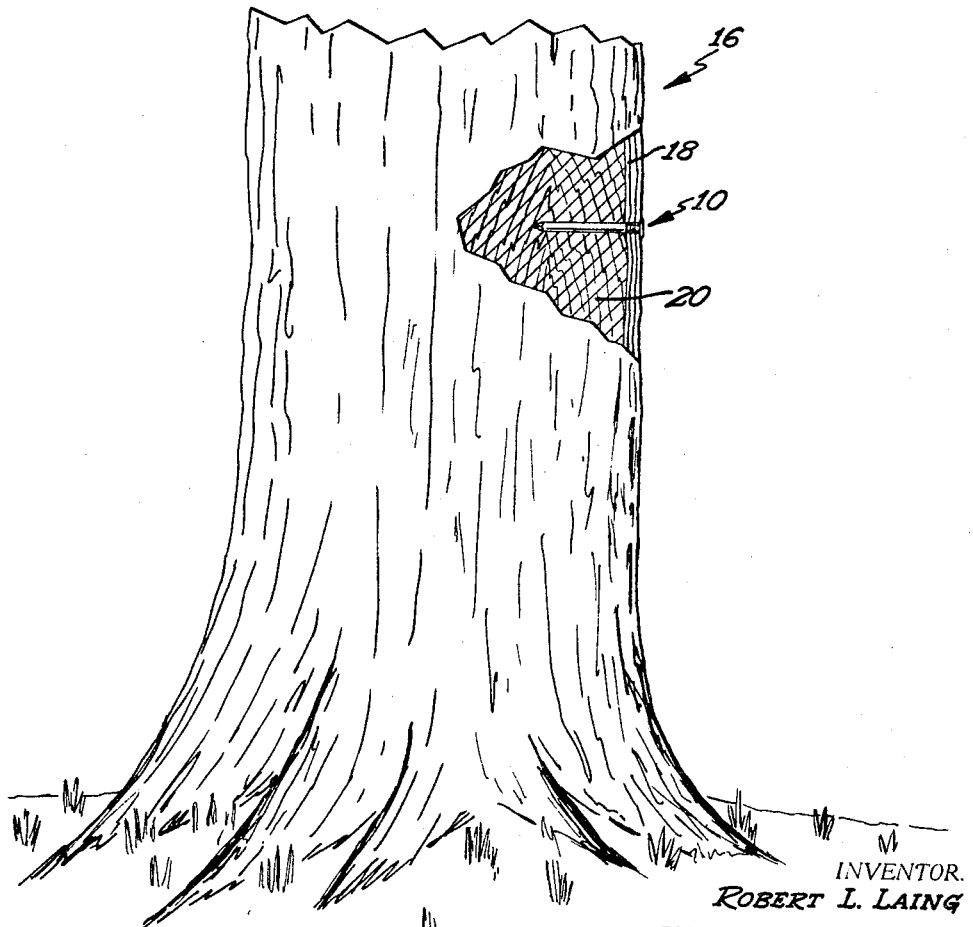

Other and further features and objects of the present invention will be more apparent to those skilled in the art upon a consideration of the following description, wherein various forms of chemical compositions for carrying out the invention are disclosed, and of the accompanying drawing in which FIGURE 1 is an elevational view, partially broken away and in section, of a tree treating device fabricated in accordance with the present invention; and FIGURE 2 is an elevational view of a trunk of a tree, partly in section, having the apparatus of the present invention driven therein.

The general formula for preparing a water soluble implanting device for implanting trace minerals directly into plant tissue is one gallon of water soluble glue or affixative, into which is mixed dry salts consisting of one pint ocean salt, one pint boron salt, one and one-half pints magnesium salt, one-half pint copper salt, one-fourth pint molybdenum salt, one-half pint manganese salt, one and one-half pints zinc salt, one and one-half pints iron salts, one-sixteenth pint powdered cobalt or its salt, one pint tartaric acid, and one-half pint ethylenediaminetetraacetic acid or other chelating agent.

Although the preferred amounts of these chemicals are given above, it should be noted that these amounts can be varied somewhat without deviating from the intent of this invention.

The above mixture then is formed into solid implanting devices by coating the shanks of common carpenter's nails, such as ring-shanked shingle nails, or other implanting devices such as staples or wedges, or by forming into pellets, nails, or bullets. In addition to these novel methods of injection, old methods could be used, such as injecting the above salts mixed with water or other liquid using a syringe or tube.

Referring to the drawing, a planting device 10 is shown in the form of a conventional carpenter's nail or the like having a head portion 12 and a cylindrical shank portion 14. The nail 10 is adapted to be driven into the body of a tree 16, such as illustrated in FIGURE 2, the shank portion of the nail being sufficiently long to extend through the bark portion 18 and through the cambium layer portion into the sapwood 20. The sap is, of course, normally transferred along the tree structure at the interface between the bark area or layer 18 and the woody area 20. The coating described above is designated in FIGURE 1 by the reference numeral 22. This coating is referred to by the legend "Coating of Water Soluble Affixative Mixed With Various Metallic Trace Elements." The coating 22, it will be noted from a comparison of FIGURES 1 and 2, is located so that at least a portion of it is adapted to remain in the sap flow zone.

The metallic salts would be in the form of nitrates for use in nitrogen deficient areas, phosphates for use in phosphorous deficient areas, ammoniated phosphates and superphosphates for nitrogen and phosphorous deficient areas, acetates, sulfates, propionates, and butyrates for alkaline soils, and tartrates or sulfates for fungi infested areas.

Alternate modifications of the composition or means for accomplishing the desired function would be to use borax or boric acid in place of the boron salts indicated, and sodium molybdate or molybdenum trioxide in place of the molybdenum salts indicated above. The consideration in these cases would merely be cost and relative solubility. The use of chelates is not necessary with the sulfates, acetates, nitrates, or tartrates because of their high inherent solubility. Tartaric acid is not necessary in combination with the tartrate salts of the metals. Some salts can be omitted in certain localities.

Although only the preferred embodiment of devices for carrying out the invention have been described above, it is not to be construed that my invention is limited to such embodiments. Other modifications may be made by those skilled in the art without departing from the spirit and scope of the invention defined below.

As thus described the composition and method for treating trees of the present invention is characterized as an improved composite unit that consists in the use of more chemical fertilizer material than was described in the parent application and the substitution of nitrates, phosphates, ammoniated phosphates, acetates, propionates, butyrates, hydroxides, and tartrates of the metals of the parent application for the purpose of producing more favorable results in each locality, and the addition of a chelating agent to make the trace minerals more soluble in the plant tissue.

Having thus described my invention, I claim:

1. A nail or solid implanting device embodying portions of a mixture consisting in the ratio of 1 gallon water soluble glue or affixative, into which is mixed dry salts consisting substantially of one pint ocean salt, one pint boron salt, one and one-half pints magnesium salt, one-half pint copper salt, one-fourth pint molybdenum salt, one-half pint manganese salt, one and one-half pints zinc salt, one and one-half pints iron salts, one-sixteenth pint powdered cobalt, one pint tartaric acid, and one pint a chelating agent.

2. A nail or solid implanting device embodying portions of a mixture consisting in the ratio of 1 gallon water soluble glue or affixative, into which is mixed dry salts consisting substantially of one pint ocean salt, one pint boron salt, one and one-half pints magnesium salt, one-half pint copper salt, one-fourth pint molybdenum salt, one-half pint manganese salt, one and one-half pints zinc salt, one and one-half pints iron salts, one-sixteenth pint powdered cobalt, and one pint tartaric acid.

3. A nail or solid implanting device embodying portions of a mixture consisting in the ratio of 1 gallon water soluble glue or affixative, into which is mixed dry salts consisting substantially of one pint ocean salt, one pint boron salt, one and one-half pints magnesium salt, one-half pint copper salt, one-fourth pint molybdenum salt, one-half pint manganese salt, one and one-half pints zinc salt, one and one-half pints iron salts, one-sixteenth pint powdered cobalt, and one pint a chelating agent.

4. A nail or solid implanting device embodying portions of a mixture comprising ingredients in the ratio of 1 gallon water soluble glue or affixative, into which is mixed dry compounds consisting substantially of one pint ocean salt, one pint boron compound, one and one-half pints magnesium compound, one-half pint copper compound, one-fourth pint molybdenum compound, one-half pint manganese compound, one and one-half pints zinc compound, one and one-half pints iron compound.

5. A nail or solid implanting device embodying portions of a mixture consisting in the ratio of 1 gallon water soluble glue or affixative, into which is mixed dry salts consisting substantially of one pint ocean salt, one pint boron salt, one and one-half pints magnesium salt, one-half pint copper salt, one-fourth pint molybdenum salt, one-half pint manganese salt, one and one-half pints zinc salt, one and one-half pints iron salts, one pint tartaric acid, and one pint a chelating agent.

6. The device of claim 1 in which the salts of magnesium, copper, molybdenum, manganese, zinc, and iron are further characterized as being selected from the group consisting of nitrates, phosphates, ammoniated phosphates, acetates, sulfates, propionates, butyrates, and tartrates.

7. The device of claim 4 in which the boron compound is selected from the group consisting of borax and boric acid.

8. The device of claim 4 in which the molybdenum compound is selected from the group consisting of sodium molybdate and molybdenum trioxide.

9. The device of claim 4 in which the compounds of magnesium, copper, molybdenum, manganese, zinc, and iron are hydroxides of these metals.

10. A nail or solid implanting device embodying a mixture consisting of water soluble glue or affixative into which is mixed chemicals comprising substantial and non-toxic portions of ocean salt, boron compound, magnesium compound, copper compound, molybdenum compound, manganese compound, zinc compound, iron compound, and a chelating agent.

11. The device of claim 10 in which the mixture also includes tartaric acid.

References Cited by the Examiner

UNITED STATES PATENTS

| | | | |
|---|---|---|---|
| 75,560 | 3/1868 | McKenzie | 47—57.5 X |
| 3,074,207 | 1/1963 | Laing | 47—57.5 |

FOREIGN PATENTS

| | | |
|---|---|---|
| 545,467 | 3/1956 | Belgium. |
| 786,083 | 11/1957 | Great Britain. |

ABRAHAM G. STONE, *Primary Examiner.*

T. GRAHAM CRAVER, *Examiner.*

L. J. BLACKMAR, R. E. BAGWILL,
*Assistant Examiners.*